UNITED STATES PATENT OFFICE.

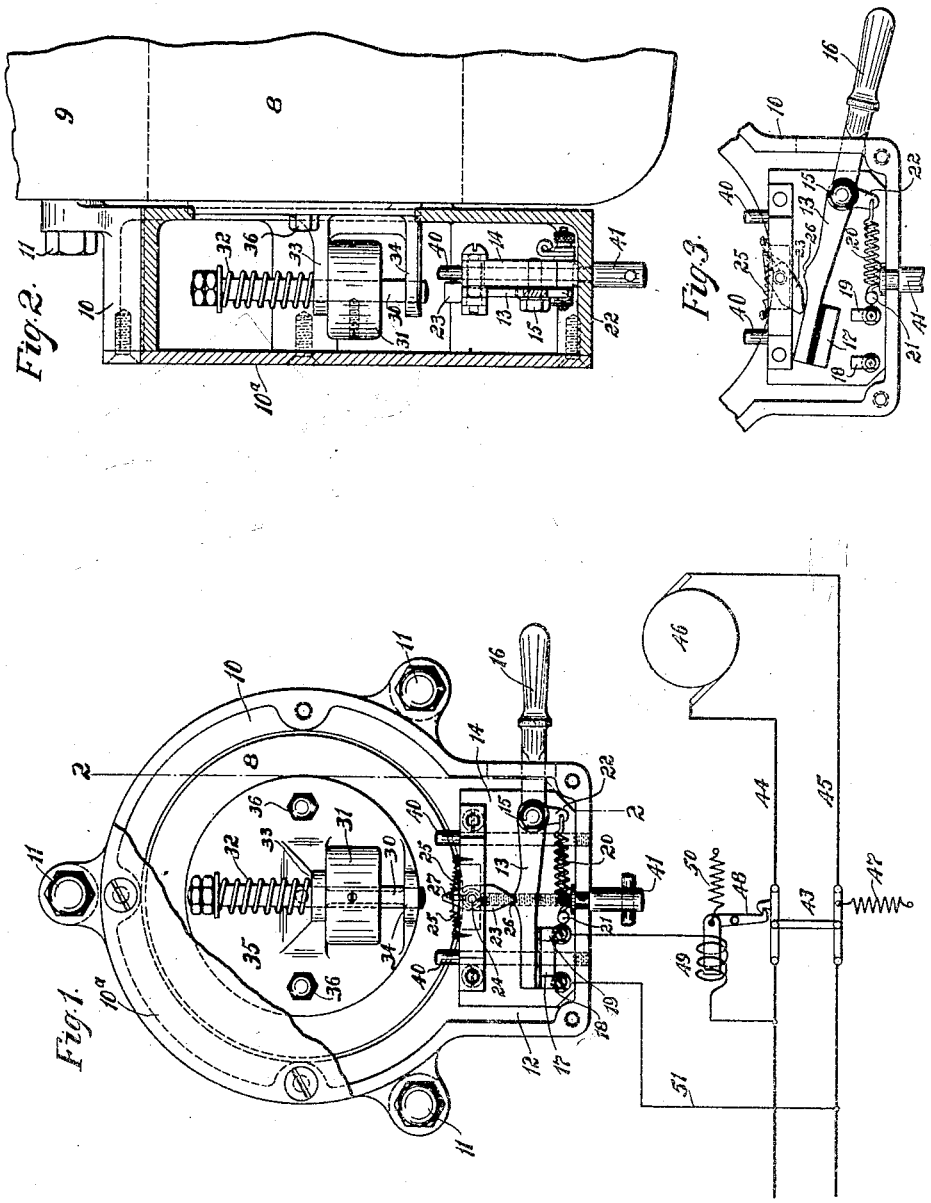

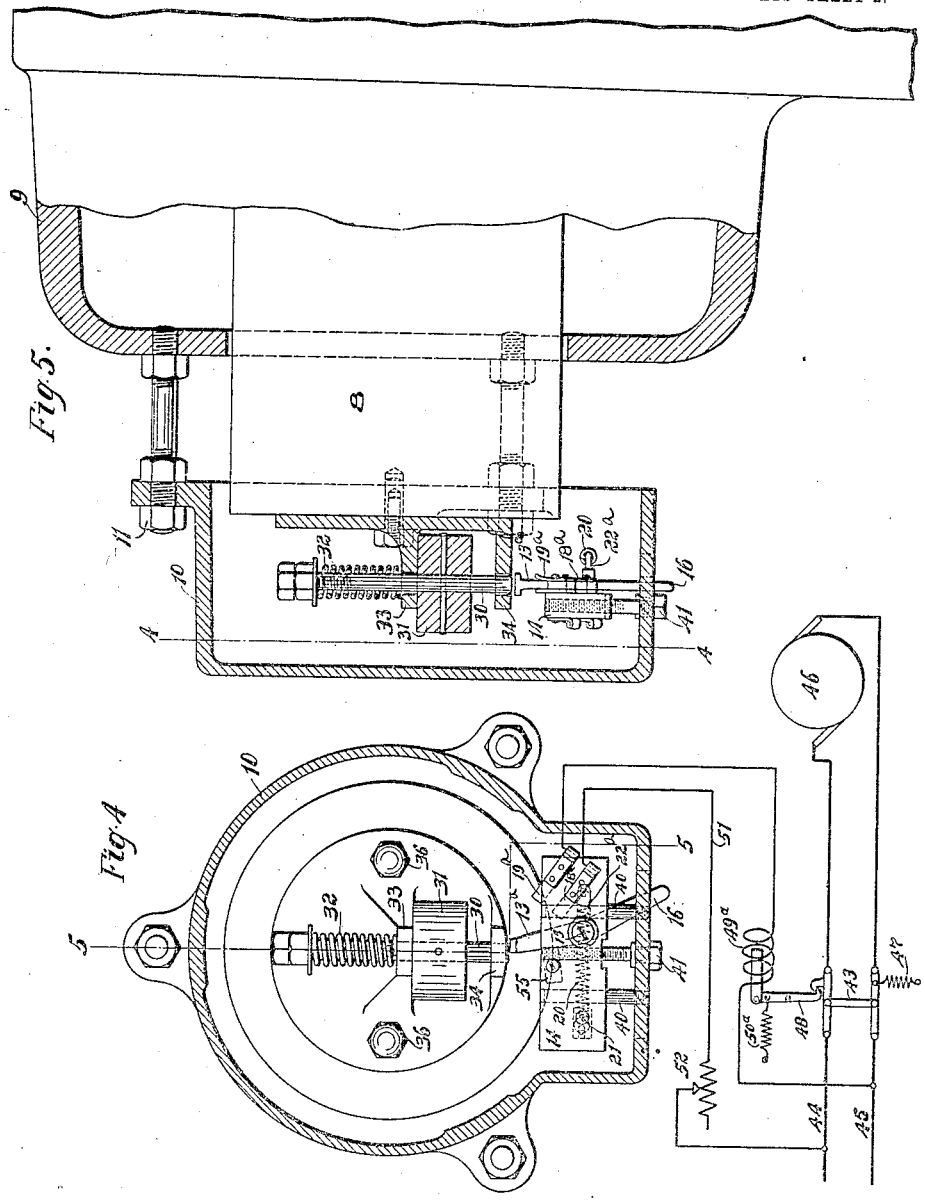

WILLIAM D. POMEROY, OF NORWOOD, AND ANTHONY L. McHUGH, OF CINCINNATI, OHIO, ASSIGNORS TO THE BULLOCK ELECTRIC MANUFACTURING COMPANY, A CORPORATION OF OHIO.

SPEED-LIMITING DEVICE.

934,211.  Specification of Letters Patent.  Patented Sept. 14, 1909.

Application filed March 9, 1905. Serial No. 249,185.

*To all whom it may concern:*

Be it known that we, WILLIAM D. POMEROY and ANTHONY L. McHUGH, citizens of the United States, residing at Norwood and Cincinnati, in the county of Hamilton and State of Ohio, have invented certain new and useful Improvements in Speed-Limiting Devices, of which the following is a full, clear, and exact specification.

Our invention relates to speed limiting devices as applied to rotating parts of machines and more particularly as applied to the rotating members of dynamo electric machines of the rotary converter or motor-generator type.

Our invention is adapted for use in connection with a variety of types of machines, but is especially applicable to rotary converters, which are ordinarily employed to convert alternating current received from a source of supply into direct current which is fed into a direct current distribution system. Under certain abnormal conditions of field strength, load and voltage, a compound wound rotary converter will run as an inverted rotary and will speed up to a dangerous extent. It is very desirable under these circumstances to provide some means for automatically regulating the supply of current to the machine or for cutting off entirely the direct current source of supply from the machine when its speed rises above a predetermined value.

The object of our invention is to limit the speed of a dynamo electric machine, and more especially to eliminate the danger resulting from a derangement of the electrical connections of the machine and especially of the field circuits and of the alternating current supply circuits of a rotary converter by means of a simple, efficient, and effective mechanism.

In one of its aspects our invention comprises the combination of a dynamo electric machine having a circuit breaker in the mains thereof, with a speed limiting device for said machine, said speed limiting device comprising a switch mounted in proximity to the rotatable member of the machine for controlling said circuit breaker, and a centrifugal device in operative relationship to said rotatable member and adapted to operate the switch when the speed of the rotatable member reaches a predetermined value.

In another of its aspects the invention comprises the combination of a rotatable member, a switch mounted adjacent to said member and means carried by said rotatable member for causing the operation of said switch when the speed of the rotatable member rises above a predetermined value.

The invention further comprises certain novel combinations of coöperating elements which will be hereinafter clearly described and more specifically set forth in the appended claims.

The invention will be more clearly understood by reference to the accompanying drawings, in which—

Figure 1 represents an end view of a rotatable member, such as the shaft of a dynamo electric machine, equipped with our improved centrifugally operated switch; Fig. 2 is a vertical sectional view on the line 2—2 of Fig. 1; Fig. 3 is a view of the switch shown in Fig. 1 in its open position; Fig. 4 is a sectional elevation on the line 4—4 of Fig. 5 showing a slightly modified form of our centrifugally operated switch; Fig. 5 is a sectional view on the line 5—5 of Fig. 4.

Referring now to the preferred modification of our improved speed limiting device, illustrated in Figs. 1, 2, and 3, the rotatable member, or shaft, is illustrated at 8. This shaft rotates in a bearing, the housing of which is indicated at 9. Fastened by means of bolts 11 to said housing adjacent to the shaft is a casing 10 provided at its lower end with a pocket 12 containing the centrifugally operated switch. The movable member of this switch is shown at 13, pivoted to the adjustable block 14 at 15. This movable member is provided with the handle 16 and the bridging contact 17, the latter being insulated from the member 13. The bridging member 17 is adapted to connect electrically the contacts 18 and 19 of the switch. The spring 20, one end of which is attached to the adjustable block 14 at 21, and the other end of which is attached to lug 22 formed integral with the blade 13, tends normally to move said switch blade into one of its operative positions. In the preferred modification shown in Figs. 1, 2, and 3, the spring 20 tends normally to open the switch. The switch is prevented from opening by holding means, such as a latch or dog 23. This dog is pivoted to the adjustable block 14 at 24 and is normally maintained in a vertical position, as shown in Fig. 1, by means of the springs 25 so as to engage the notch 26 in the switch member 13. The upper end 27 of said dog projects into the path followed by the centrifugal device mounted upon the rotatable member 8, said device being adapted to trip the dog to permit the switch to open under the action of the spring 20 when the speed of the rotatable member 8 reaches a predetermined value. Said centrifugal device comprises a spindle 30 carrying the weight 31, adapted to move outwardly relative to the axis of rotation of the rotatable member 8 against the action of spring 32. The spindle 30 is constrained to move in the guides 33 and 34 formed in the frame 35, which is fastened to the rotatable member by means of the bolts 36. For a definite speed of the shaft or rotatable member 8 the outer end of the spindle 30 will follow a definite path. This path changes as the speed changes. Therefore to adjust the device so as to operate the switch at any desired speed, we mount the switch and dog upon the adjustable block 14 and so arrange said block as to move upon the vertical guide pins 40 under the action of the adjusting screw 41. The casing 10 is provided with a cover 10$^a$ which is readily removable so that the mechanism contained within said casing may be readily inspected.

In the preferred modification, the contacts 18 and 19 and bridging member 17 control the circuit breaker 43 located in the mains 44 and 45 leading to the dynamo electric machine 46. This dynamo electric machine may be a rotary converter or any other type of machine to which my invention is applicable, and the shaft 8 may form part of said machine, or 46 may be an independent machine connected to and driving shaft 8. The circuit breaker is diagrammatically illustrated as biased to open position by means of the spring 47 and held in its closed position by means of the pivoted latch 48, which is operated in one direction by the solenoid 49 and in the opposite direction by the spring 50. The solenoid 49 is connected in a shunt circuit 51 across the mains 44 and 45. The current normally flows through this shunt circuit 51 through contacts 17, 18, and 19 of the controlling switch, through the solenoid 49 to main 44. So long as the solenoid 49 remains energized, its core will hold the catch 48 in position against the action of spring 50 so as to hold the circuit breaker 43 in its closed position against the action of spring 47. If in the operation of the shaft 8, its speed rises above a predetermined value, the spindle 30 will move outwardly under the action of centrifugal force and its outer end will strike the upper end 27 of the dog 23 and move said dog against the action of one of its springs 25 into the position shown in Fig. 3. This movement releases the member 13 from the holding action of said dog and permits the switch to be opened by spring 20. The opening of said switch immediately deënergizes the solenoid 49 and the catch 48 is moved by spring 50, permitting the circuit breaker 43 to be opened by spring 47 and to cut off the supply of current to the dynamo electric machine 46. The switch controlling said circuit breaker is closed by means of the handle 16, and when closed the dog 23 is moved by means of its spring 25 automatically into such a position as to permit the lower end of the dog to engage the notch 26 and retain the switch in said closed position until tripped again by the centrifugal device. When our improved speed limiting device is applied to a rotary converter, 46 illustrates the commutator of the direct current side of the machine and when the speed of said machine rises above a predetermined value the direct current side of the machine is cut off from the direct current mains 44 and 45.

Referring now to the modification illustrated in Figs. 4 and 5, the centrifugal device mounted upon the end of shaft 8 is substantially the same as that illustrated in the modification shown in Figs. 1, 2, and 3. In this modification (Figs. 4 and 5) the dog 23 is omitted and the spindle 30 acts directly upon the switch arm 13$^a$, which is thrown from an open position, as shown in Fig. 4, into a closed position in engagement with the contacts 18$^a$ and 19$^a$, said last mentioned contacts being connected in a shunt circuit across the mains 44 and 45 through an adjustable resistance 52. Located in this shunt circuit 51 is a solenoid 49$^a$ which operates upon the catch 48 against the action of a spring 50$^a$ to trip the circuit breaker 43 when said solenoid is energized by the closing of the centrifugally operated switch. The said centrifugally operated switch is mounted upon the adjustable block 14, which is slidable on the pins 40, and is adjustable by means of the adjusting screw 41. The movable arm 13$^a$ of said switch is pivoted to said block at 15 and in its open position abuts against the stop 55, being held in said position by the spring 20, one end of which is fastened to the adjustable block 14 at 21 and the other end of which is attached to the lug 22$^a$ formed integral with the pivoted arm 13$^a$. The spring and lug 22$^a$ are so arranged relative to arm 13$^a$, that when the latter is engaged by spindle 30, the switch closes with a snap action, the switch being held in its closed position by said spring. The arm 13$^a$ is provided with a handle 16 which projects outside of the casing 10 and serves to reset the centrifugally operated switch after it has been tripped by the centrifugal device. This modified form of the centrifugally operated switch is adapted to be tripped by the spindle 30 in but one direction of rotation of shaft 8, while the switch illustrated in Figs. 1, 2, and 3 is adapted to be tripped in either direction of rotation of said shaft when a predetermined speed is reached.

A number of modifications and changes may be made in our invention, as herein illustrated and described, without departing from the spirit and scope thereof, and we aim in the appended claims to cover all such modifications and changes.

Having thus described our invention, what we claim as new and desire to secure by Letters Patent is:—

1. In combination, a dynamo electric machine, a circuit breaker in the mains leading to said machine, a speed limiting device comprising a switch mounted in proximity to the rotatable member of said machine and controlling said circuit breaker, and a centrifugal device in operative relationship to said rotatable member and adapted to operate said switch when the speed of the rotatable member reaches a predetermined value, and means for adjusting said switch relative to said centrifugal device so that the switch may be operated at any desired speed of the rotatable member.

2. In combination, a dynamo electric machine, a circuit-breaker in the mains leading to said machine, a speed limiting device comprising a switch mounted in proximity to the rotatable member of said machine and controlling said circuit-breaker, a centrifugal device in operative relationship to said rotatable member, means whereby said centrifugal device operates the switch to trip said circuit-breaker at a predetermined speed of the rotatable member in either direction of rotation of said member, and means for adjusting said switch relative to said centrifugal device so that the switch may be operated at any desired speed of the rotatable member.

3. In combination, a rotatable member, a switch mounted adjacent to said member, means carried by said rotatable member for causing the operation of said switch when the speed of the rotatable member rises above a predetermined value, and means for adjusting the position of said switch.

4. In combination, a rotatable member, a switch mounted adjacent to said rotatable member, a centrifugal device carried by said member and adapted to cause the operation of said switch when a predetermined speed of said rotatable member is reached, and means for adjusting the position of said switch relative to said centrifugal device.

5. In combination, a rotatable member, a switch mounted adjacent to said rotatable member, a centrifugal device carried by said member and adapted to cause the operation of said switch when a predetermined speed of said rotatable member is reached in either direction of rotation of said member, and means for adjusting said switch relative to said centrifugal device so that the switch may be operated at any desired speed of said member.

6. In combination, a rotatable member, a switch mounted adjacent to said member, means for holding the movable member of said switch in a predetermined position, a centrifugal device carried by said rotatable member and adapted to trip said holding means at a predetermined speed of said rotatable member, means for moving said switch member into another position when released from said holding means, and means for adjusting the position of said switch relative to said centrifugal device.

7. In combination, a rotatable member, a switch mounted adjacent to said member, means for holding the movable member of said switch in a predetermined position, a centrifugal device carried by said rotatable member and adapted to trip said holding means at a predetermined speed of said rotatable member, means for moving said switch member into another position when released from said holding means, said centrifugal device comprising a weighted spindle, and means for constraining said spindle to move away from the axis of rotation of the rotatable member as the speed of same increases, the end of said spindle following different paths for different speeds of said member, and a casing inclosing the centrifugal device and the switch.

8. In combination, a rotatable member, a switch mounted adjacent to said member, means for holding the movable member of said switch in a predetermined position, a centrifugal device carried by said rotatable member and adapted to trip said holding means at a predetermined speed of said rotatable member, said centrifugal device comprising a weighted spindle, and means for constraining said spindle to move away from the axis of rotation of the rotatable member as the speed of same increases, the end of said spindle following different paths for different speeds of said member, and means for moving said switch member into another position when released from said holding means, and means for adjusting said holding means relative to the path of the end of said spindle so that same may be tripped at any desired speed.

9. In combination, a rotatable member, a switch mounted adjacent to one end of said member, a spring tending to move the movable member of said switch into one of its operative positions, a dog for holding said switch member in its other operative position against the action of said spring, a centrifugal device mounted on said rotatable member and adapted to trip the dog and permit said switch member to move under the action of said spring at a predetermined speed of said member, and means for adjusting said dog relatively to said centrifugal device.

10. In combination, a rotating shaft, a switch mounted adjacent thereto, a centrifugal device mounted on said shaft and arranged to cause said switch to open when the speed of the shaft exceeds a predetermined value, and means for adjusting the distance of said switch from the shaft to vary the speed at which the switch will be opened.

11. In combination, a rotatable member, a switch mounted adjacent to said member and biased toward one operative position, a dog which in its middle position holds said switch in the other operative position, and a centrifugal device mounted on said rotatable member and arranged to move said dog out of its middle position when the speed of said rotatable member exceeds a predetermined value in either direction.

12. In combination, a rotatable member, a switch mounted adjacent to said member and biased toward one operative position, a dog which in its middle position holds said switch in the other operative position, a centrifugal device mounted on said rotatable member and arranged to move said dog out of its middle position when the speed of said rotatable member exceeds a predetermined value in either direction, and a centering spring for said dog.

13. In combination, a rotatable member, a switch mounted adjacent to said member and biased toward one operative position, a dog which in its middle position holds said switch in the other operative position, and a centrifugal device mounted on a rotatable member and arranged to engage said dog and move it out of its middle position in one direction or the other at a predetermined speed of the rotatable member in either direction, the direction of movement of the dog depending on the direction of rotation of the rotatable member.

14. In combination, a rotatable member, a switch mounted adjacent to said member and biased toward one operative position, a dog which in its middle position holds said switch in the other operative position, a centrifugal device mounted on a rotatable member and arranged to engage said dog and move it out of its middle position in one direction or the other at a predetermined speed of the rotatable member in either direction, the direction of movement of the dog depending on the direction of rotation of the rotatable member, and a centering spring for said dog.

15. In combination, a rotatable member, a switch mounted adjacent to said member and biased toward one operative position, a dog for holding said switch in its other operative position, means carried by said rotatable member for moving said dog out of holding position at a predetermined speed of said member, and means for adjusting said dog relative to the aforesaid means.

In testimony whereof we affix our signatures, in the presence of two witnesses.

WILLIAM D. POMEROY.
ANTHONY L. McHUGH.

Witnesses:
LAURENT LOWENBERG,
FRED J. KINSEY.